US012602873B2

(12) United States Patent
Petikam et al.

(10) Patent No.: US 12,602,873 B2
(45) Date of Patent: Apr. 14, 2026

(54) AUTOMATIC RETOPOLOGIZATION OF TEXTURED 3D MESHES

(71) Applicant: MICROSOFT TECHNOLOGY LICENSING, LLC, Redmond, WA (US)

(72) Inventors: Lohit Dev Petikam, Cambridge (GB); Charles Thomas Hewitt, Cambridge (GB); Tadas Baltrusaitis, Cambridge (GB); Stephan Joachim Garbin, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 161 days.

(21) Appl. No.: 18/522,197

(22) Filed: Nov. 28, 2023

(65) Prior Publication Data

US 2025/0173965 A1    May 29, 2025

(51) Int. Cl.
*G06T 17/20* (2006.01)
*G06V 40/16* (2022.01)

(52) U.S. Cl.
CPC ............ *G06T 17/20* (2013.01); *G06V 40/169* (2022.01)

(58) Field of Classification Search
None
See application file for complete search history.

(56) References Cited

U.S. PATENT DOCUMENTS

| | | | | |
|---|---|---|---|---|
| 11,900,557 | B2 * | 2/2024 | Lin | ......................... G06T 19/20 |
| 2017/0255745 | A1 * | 9/2017 | Mihalef | ................. G06T 7/149 |
| 2022/0392251 | A1 * | 12/2022 | Zhang | .................... G06T 19/20 |
| 2023/0281863 | A1 | 9/2023 | Valentin et al. | |

FOREIGN PATENT DOCUMENTS

| | | | |
|---|---|---|---|
| CN | 112669447 | A * | 4/2021 |

OTHER PUBLICATIONS

Gilani et al., Dense 3D Face Correspondence, IEEE Transactions on Pattern Analysis and Machine Intelligence, vol. 40, No. 7, pp. 1584-1597, Jul. 2018 (Year: 2018).*

(Continued)

*Primary Examiner* — Kee M Tung
*Assistant Examiner* — Biao Chen
(74) *Attorney, Agent, or Firm* — Newport IP, LLC; Tyler Thorp

(57) ABSTRACT

Methods and apparatuses for automating the retopologization of 3D meshes including the automated selection and adjustment of correspondence points are described. The automated selection of correspondence points may be performed to refine locations of correspondence points using a matching score that is computed based on surface normal similarity between surfaces corresponding with a candidate correspondence point on an input scan mesh and a point on a morphable model of 3D surfaces. The matching score may also take into account a distance between a candidate correspondence point on the input scan mesh and a corresponding point on the morphable model of 3D surfaces and similarities in surface features, such as similarities in surface curvature at the candidate correspondence point on the input scan mesh and the corresponding point on the morphable model of 3D surfaces.

20 Claims, 9 Drawing Sheets

Acquire a set of images that includes images capturing different viewpoints of an object — 302

Generate an input scan mesh for the object using the set of images — 304

Generate an intermediate mesh for the object that has a topology that approximates the input scan mesh — 306

Identify a keypoint on the intermediate mesh — 308

Determine a distance between the keypoint on the intermediate mesh and a candidate correspondence point on the input scan mesh — 310

Determine a first surface normal associated with the keypoint and a second surface normal associated with the candidate correspondence point — 312

Calculate a matching score based on the distance between the keypoint and the candidate correspondence point, the first surface normal, and the second surface normal — 314

Select the candidate correspondence point based on the matching score — 316

Adjust the intermediate mesh using the candidate correspondence point — 318

Generate a 3D mesh for the object by applying photometric refinement to the intermediate mesh — 320

(56) References Cited

OTHER PUBLICATIONS

Kanazawa et al.,End-to-end Recovery of Human Shape and Pose, arXiv.org arXiv:1712.06584v2 [cs.CV] Jun. 23, 2018 (Year: 2018).*

Lin et al., a machine-translated English version for a foreign patent document (CN 112669447 A) (Year: 2021).*

"R3DS Wrap4D", Retrieved from: https://web.archive.org/web/20230321171106/https://www.russian3dscanner.com/wrap4d/, Mar. 21, 2023, 5 Pages.

Brunton, et al., "Review of Statistical Shape Spaces for 3D Data with Comparative Analysis for Human Faces", In repository of arXiv:1209.6491v3, May 4, 2014, pp. 1-21.

Fyffe, et al., "Multi-View Stereo on Consistent Face Topology", In Journal of Computer Graphics Forum, vol. 36, Issue 2, May 2017, 15 Pages.

Salazar, et al., "Fully Automatic Expression-Invariant Face Correspondence", In Repository of arXiv:1202.1444v2, Jan. 30, 2013, pp. 1-27.

Wood, et al., "3D Face Reconstruction with Dense Landmarks", In repository of arXiv:2204.02776v2, Jul. 20, 2022, pp. 1-24.

Gabriele, et al., "Displacement Mapping as a Metric Tool for Optimizing Mesh Models Originated by 3D Digitization", vol. 9, Issue No. 2, In Journal on ACM Computing and Cultural Heritage, May 20, 2016, 23 Pages.

International Search Report and Written Opinion received for PCT Application No. PCT/US2024/055411, mailed on Feb. 17, 2025, 10 Pages.

* cited by examiner

Refinement 136

Intermediate Mesh 120

Input Scan Mesh 110

Image 170

Landmark 172

Reconstruction 174

Landmark 184

Landmark 182

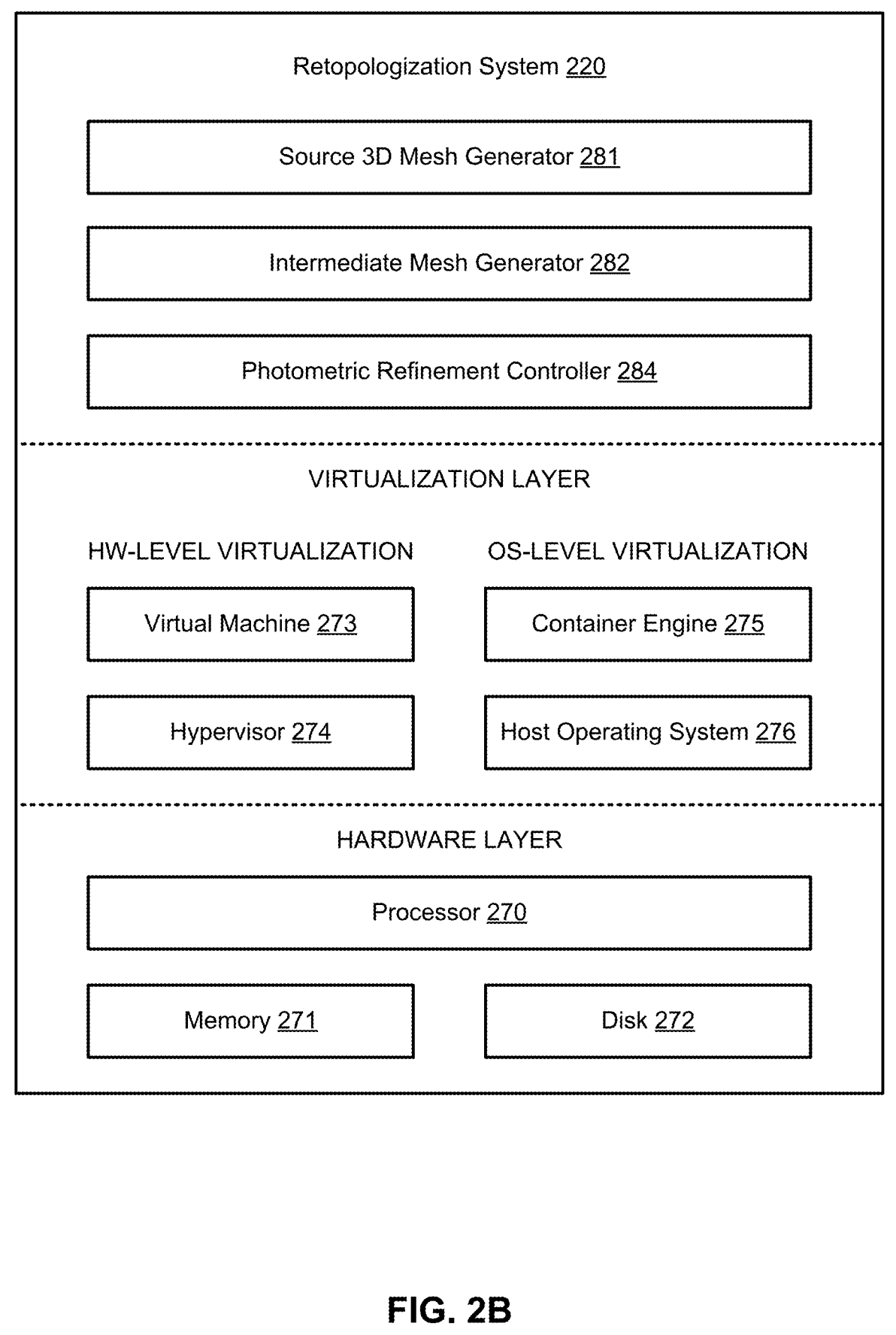

Retopologization System 220

Source 3D Mesh Generator 281

Intermediate Mesh Generator 282

Photometric Refinement Controller 284

VIRTUALIZATION LAYER

HW-LEVEL VIRTUALIZATION          OS-LEVEL VIRTUALIZATION

Virtual Machine 273          Container Engine 275

Hypervisor 274          Host Operating System 276

HARDWARE LAYER

Processor 270

Memory 271          Disk 272

FIG. 2B

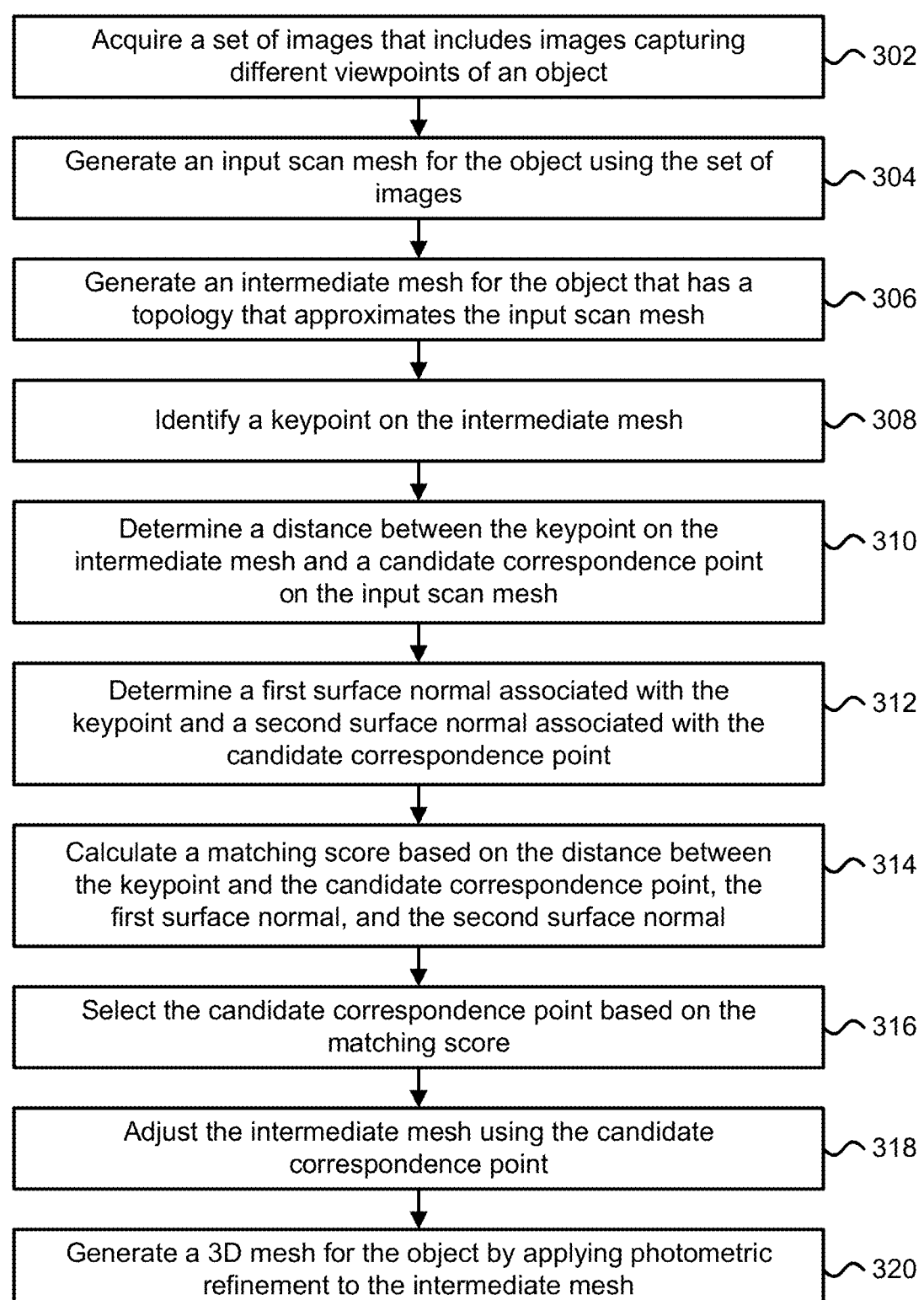

Acquire a set of images that includes images capturing different viewpoints of an object ⟋⁓302

Generate an input scan mesh for the object using the set of images ⟋⁓304

Generate an intermediate mesh for the object that has a topology that approximates the input scan mesh ⟋⁓306

Identify a keypoint on the intermediate mesh ⟋⁓308

Determine a distance between the keypoint on the intermediate mesh and a candidate correspondence point on the input scan mesh ⟋⁓310

Determine a first surface normal associated with the keypoint and a second surface normal associated with the candidate correspondence point ⟋⁓312

Calculate a matching score based on the distance between the keypoint and the candidate correspondence point, the first surface normal, and the second surface normal ⟋⁓314

Select the candidate correspondence point based on the matching score ⟋⁓316

Adjust the intermediate mesh using the candidate correspondence point ⟋⁓318

Generate a 3D mesh for the object by applying photometric refinement to the intermediate mesh ⟋⁓320

FIG. 3A

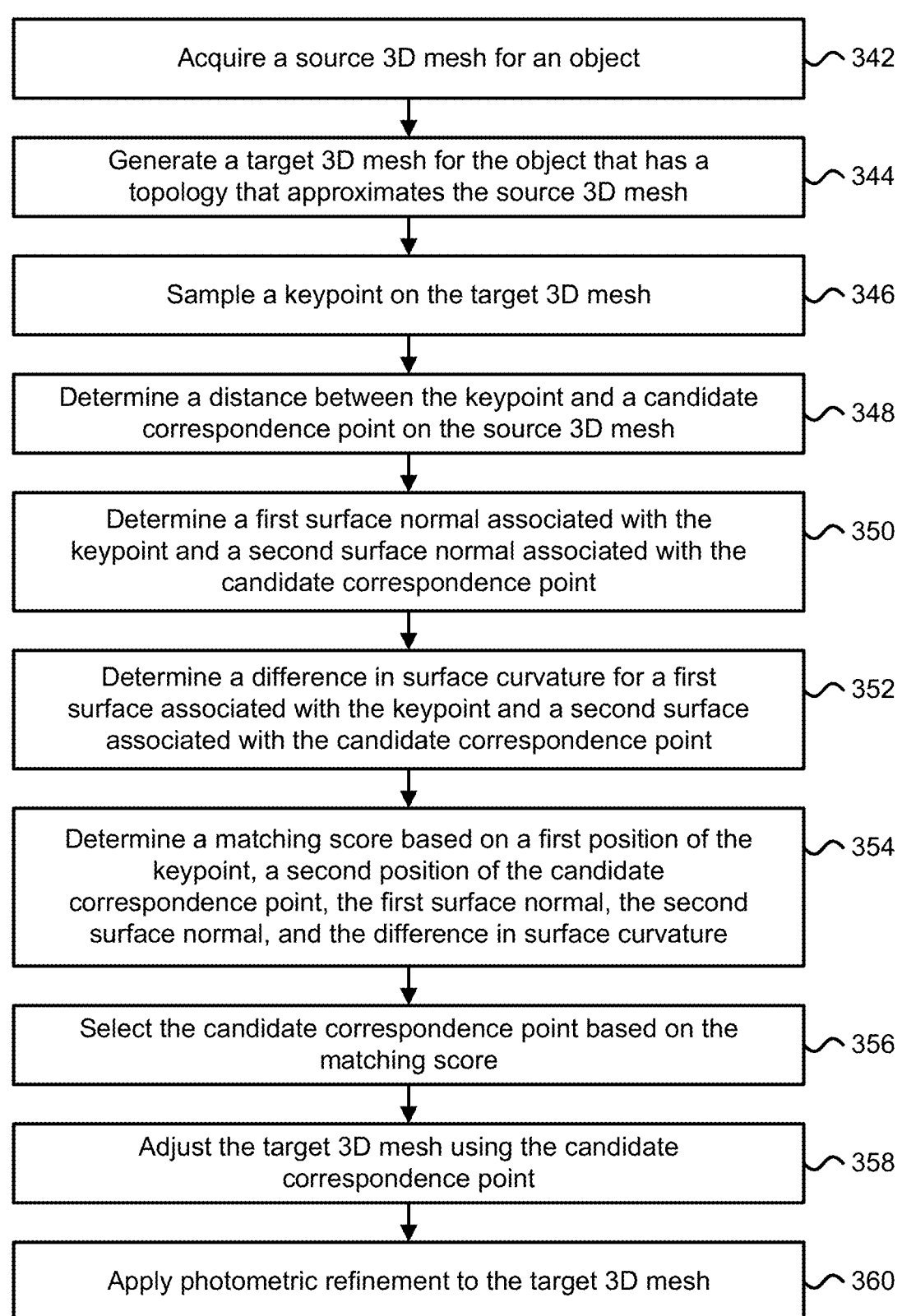

Acquire a source 3D mesh for an object ⟿ 342

Generate a target 3D mesh for the object that has a topology that approximates the source 3D mesh ⟿ 344

Sample a keypoint on the target 3D mesh ⟿ 346

Determine a distance between the keypoint and a candidate correspondence point on the source 3D mesh ⟿ 348

Determine a first surface normal associated with the keypoint and a second surface normal associated with the candidate correspondence point ⟿ 350

Determine a difference in surface curvature for a first surface associated with the keypoint and a second surface associated with the candidate correspondence point ⟿ 352

Determine a matching score based on a first position of the keypoint, a second position of the candidate correspondence point, the first surface normal, the second surface normal, and the difference in surface curvature ⟿ 354

Select the candidate correspondence point based on the matching score ⟿ 356

Adjust the target 3D mesh using the candidate correspondence point ⟿ 358

Apply photometric refinement to the target 3D mesh ⟿ 360

FIG. 3B

AUTOMATIC RETOPOLOGIZATION OF TEXTURED 3D MESHES

BACKGROUND

Landmark detection is a computer vision task in which significant landmarks are detected and localized within an image or video. Facial landmark detection is a computer vision task in which a model predicts keypoints representing landmarks on a face, such as parts of eyes, nose, and lips. The keypoints can be used, for example, to detect a person's head position and rotation. Facial landmark detection may be used to facilitate head pose estimation, identifying gaze direction, and detecting facial gestures. Facial landmark detection can be challenging due to variability in image quality as well as other factors such as variability in pose and the existence of occlusions.

BRIEF SUMMARY

Systems and methods are provided for improving the performance and robustness of landmark detection systems that incorporate automated retopologization of 3D meshes. The automated retopologization of 3D meshes may include the automated selection and adjustment of correspondence points. The automated selection of correspondence points may be performed to adjust or refine locations of correspondence points using a matching score that is computed based on the surface normal similarity between a candidate correspondence point on an input scan mesh and a point on a morphable model of 3D surfaces. The matching score may also be computed based on a distance between a candidate correspondence point on the input scan mesh and a corresponding point on the morphable model of 3D surfaces and/or similarities in surface features, such as similarities in surface curvature at the candidate correspondence point on the input scan mesh and the corresponding point on the morphable model of 3D surfaces.

According to some embodiments, the technical benefits of the systems and methods disclosed herein include improved system robustness and accuracy, reduced cost of computing and storage resources, and improved system performance. Other technical benefits can also be realized through implementations of the disclosed technologies.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Like-numbered elements may refer to common components in the different figures.

FIG. 2B depicts one embodiment of various components of a retopologization system.

FIG. 3A depicts a flowchart describing one embodiment of a process for automating the retopologization of 3D meshes.

FIG. 3B depicts a flowchart describing another embodiment of a process for automating the retopologization of 3D meshes.

DETAILED DESCRIPTION

Figure 1A:
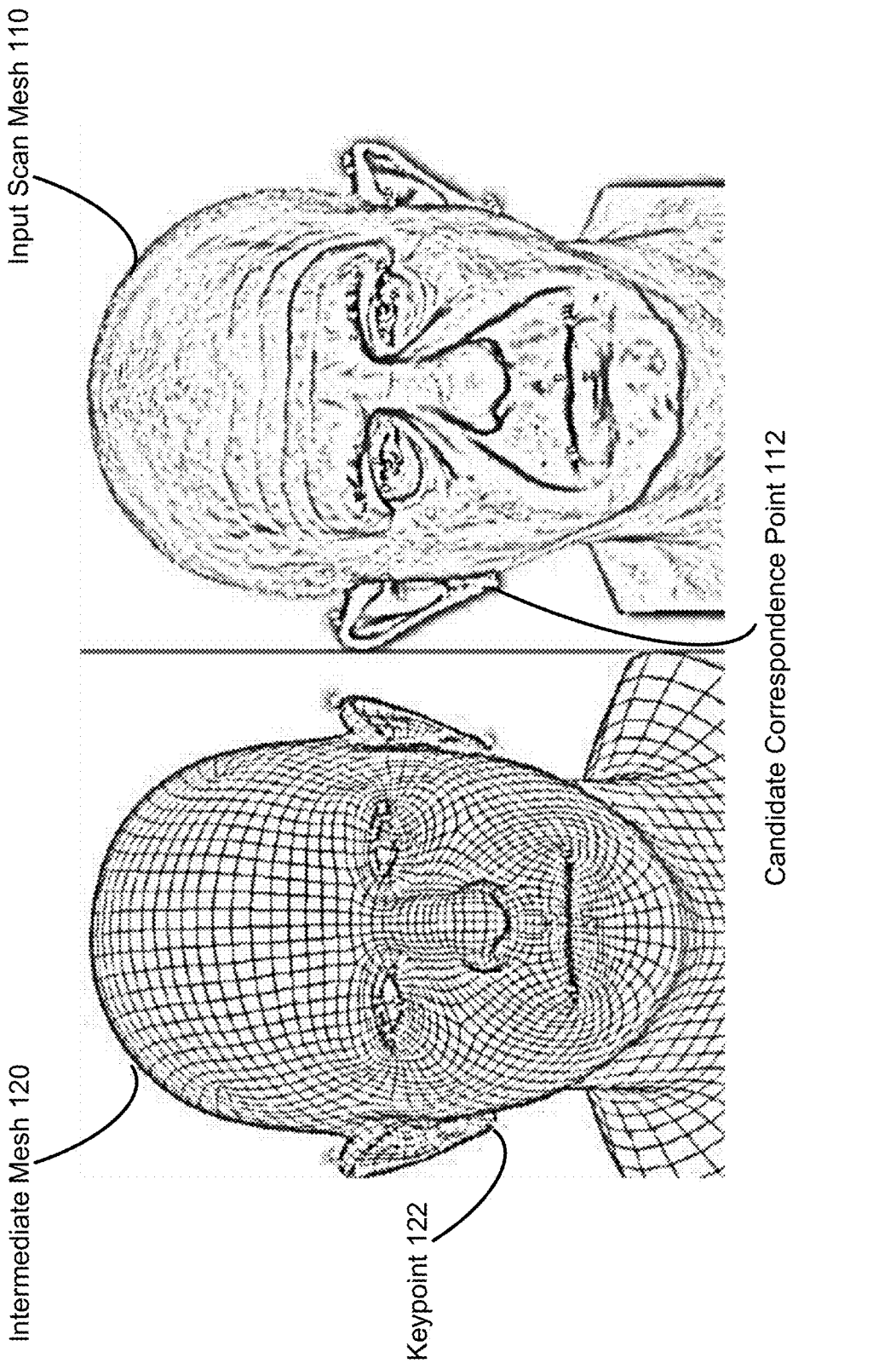
FIG. 1A depicts one embodiment of an input scan mesh and an intermediate mesh that may comprise a morphable model of 3D surfaces that has a geometry that approximates the input scan mesh.

The technologies described herein provide mechanisms for automating the retopologization of 3D meshes including the automated selection of correspondence points. Retopologization refers to the process of taking a source 3D mesh and generating a target 3D mesh that comprises a new version of the source 3D mesh that has a structured topology. The resulting target 3D mesh may be used to improve rendering, editing, and animating. The correspondence points (or correspondences) may be used to map points within the source 3D mesh to equivalent points in the target 3D mesh. In one example, correspondence points may be used to map a top of an ear in the source 3D mesh to the top of the ear in the target 3D mesh. Retopologization is typically a manual process that requires artists to rebuild a new topology point by point. Although some tools may be used to aid in the process of fitting a source 3D mesh (or template mesh) with a desired topology to the target 3D mesh, they typically require manual selection of correspondence points for every scan, and often manual cleanup as well. These manual processes that require user-annotated correspondence points are time-consuming and are prone to human error, inconsistency, and bias. The technical benefits of automating correspondence point selection include faster retopologization of 3D meshes, fewer errors and inconsistencies, and more efficient and higher fidelity reconstructions using a single pass.

In some cases, the automated retopologization of 3D meshes includes three stages. During a first stage, a morphable model of 3D surfaces is fit to a source 3D mesh via landmark detection from rendered views of an object (e.g., of a human head or torso). In one approach, a source 3D mesh (or textured 3D scan) is rendered from many points of view under uniform lighting conditions to create 2D images and an intermediate mesh is generated using the source 3D mesh and the 2D images. In another approach, a multi-camera rig may be used to collect 2D images that capture different points of view of the object and the source 3D mesh may be constructed through photogrammetry using the 2D images of the different points of view of the object under uniform lighting conditions. Keypoints may be regressed using a deep neural network (DNN) using the images and fit to the morphable model of 3D surfaces. The morphable model of 3D surfaces may comprise a parameterized 3D model (e.g., a parametric head model). The source 3D mesh may comprise an input scan mesh S and the morphable model of 3D surfaces may comprise an intermediate mesh M that has a geometry that approximates the input scan mesh S.

During a second stage, automated selection and adjustment of correspondence points is performed to refine the locations of correspondence points. The correspondence points may be automatically computed by sampling a subset of vertices (or points) on the intermediate mesh M. For each sampled point, a location on the input scan mesh S may be identified as a candidate correspondence point. The closer the distance between the sampled point on the intermediate mesh M is to the candidate correspondence point on the input scan mesh S, the better the correspondence. In some cases, the candidate correspondence point on the input scan mesh S may comprise a point within a threshold distance of the sampled point on the intermediate mesh M with the best matching surface normal or surface orientation. In one example, the input scan mesh S may correspond with a human face and 20 correspondence points may be determined to supervise the surface alignment with the intermediate mesh M.

For each candidate correspondence point, a matching score may be computed based on the similarity of the surface normal between the candidate correspondence point on the input scan mesh S and a sampled keypoint on the intermediate mesh M. For each sampled keypoint $p_M$ on the intermediate mesh M, a candidate correspondence point $p_S$ may be determined with the highest matching score to the sampled keypoint $p_M$. A matching score between the sampled keypoint $p_M$ and a candidate correspondence point $p_S$ may be expressed using the following equation (1):

$$\text{Matching Score } (p_M, p_S) = \frac{(1 + \langle n_M \mid n_S \rangle)^{\alpha}}{p_M - p_S} \tag{1}$$

In equation (1), $p_S$ is a point on the input scan mesh S, $p_M$ is the sampled keypoint on the intermediate mesh M, $n_S$ is the surface normal of S at $p_S$, and nm is the surface normal of M at $p_M$. The parameter $\alpha$ controls how closely the two normals should be matched. In one example, $\alpha$ is set to ten for human face scans. The matching score may compute an inner product for a first vector associated with the surface normal of S at $p_S$ and a second vector associated with the surface normal of M at $p_M$. In some cases, the matching score weighs a first difference between the surface normal of S at $p_S$ and the surface normal of M at $p_M$ with a second difference between the locations of the points $p_M$ and $p_S$. Furthermore, the matching score may take into account surface features, such as surface curvature.

In some embodiments, where M is not sufficiently aligned with S, the correspondences are refined by displacing pM in the direction nM by a distance d, then finding the point on S with the highest matching score. In one example, for human face scans, this refinement may be applied to keypoints behind the ears or on top of the ears with d=2 cm. For scans containing a number of keypoints greater than a threshold (e.g., more than 70 keypoints), the search for best matching points for each keypoint to points on S that are already near the keypoint may be limited to a particular number of points (e.g., to at most five candidate points).

In some cases, the distance d is set based on a degree of certainty for each keypoint. For example, if a degree of certainty for a keypoint is greater than a threshold (e.g., 0.9 or 90%), then the distance d may be set to 2 cm; however, if the degree of certainty is not greater than the threshold, then the distance d may be set to 1 cm or a distance that is less than the distance d used when the degree of certainty is equal to or greater than the threshold.

In some cases, the distance d is set based on a degree of uncertainty for each keypoint location. For example, if a degree of uncertainty for a given keypoint location is less than a threshold (e.g., 0.1 or 10%), then the distance d may be set to 2 cm; however, if the degree of uncertainty is not less than the threshold, then the distance d may be set to 1 cm or a distance that is less than the distance d used when the degree of uncertainty is less than the threshold.

During a third stage for automating the retopologization of 3D meshes photometric refinement may be performed. After retopologization, intermediate mesh M may be photometrically refined to improve representation of visual details. The photometric refinement may include an optimization to match the appearance of both S and M under the same lighting and shading model. The rendered appearance of a 3D mesh (which is used to compute image-space losses) may depend on the shape of the surface around a shaded point, and therefore may carry information about the curvature of the surface. The rendering function may utilize differentiable path tracing with a path-traced diffuse lighting model. For human face scans, the photometric refinement after retopologization may improve fine scale surface details such as wrinkles and eyes which greatly impact visual similarity and likeness. In some cases, the photometric refinement requires the fitting and correspondence-finding of the second stage to be effective; otherwise, the photometric refinement may not be possible or generate a model with the desired appearance.

One technical issue with relying on manual intervention for fitting or adapting a source 3D mesh with a desired topology to a target 3D mesh (e.g., an intermediate mesh that is generated prior to photometric refinement) is that user-annotated correspondence points are time-consuming and prone to introducing human errors and inconsistencies. The technical benefits of automating correspondence point selection using a matching score that is computed based on the surface normal similarity between a candidate correspondence point on the source 3D mesh and a point on the target 3D mesh, a distance between a candidate correspondence point on the source 3D mesh and a corresponding point on target 3D mesh, and/or similarities in surface curvature at the candidate correspondence point on the source 3D mesh and the corresponding point on the target 3D mesh include reduced time to perform retopologization of 3D meshes, fewer errors and inconsistencies, and more efficient and higher fidelity reconstructions. Moreover, the technical benefits of refining 3D landmarks (e.g., refining correspondences for ears, fingers, and feet) using automated correspondence point selection and adjustment include reduced compute and storage costs and reduced time to generate reconstructions.

In some embodiments, the automated retopologization of 3D meshes includes generating an initial estimate of correspondence points (e.g., 700 correspondence points) using keypoint detection, and then refining the initial correspondence points by moving them to a point on a 3D mesh with the most similar normal and/or the most similar surface curvature based on a matching score. To further improve accuracy of correspondences associated with complex or high-frequency facial features such as ears and eyes, the points may be displaced by the surface normal at their location (e.g., displaced by a distance of 2 cm for ears and 1 cm for eyes) before correcting these points based on the matching score.

FIG. 1A depicts one embodiment of an input scan mesh 110 and an intermediate mesh 120. The input scan mesh 110 may comprise a source 3D mesh and the intermediate mesh 120 may comprise a target 3D mesh that comprises an approximation of the source 3D mesh that has a structured topology. The keypoint 122 comprises a point on a bottom of an ear on the intermediate mesh 120 and the candidate correspondence point 112 comprises a corresponding point on a bottom of the ear on the input scan mesh 110. The input scan mesh 110 may be rendered to create multiple images of a human head from different viewpoints under controlled or uniform lighting conditions. The intermediate mesh 120 may comprise a morphable model of 3D surfaces that is fit to the input scan mesh 100 via landmark regression. The intermediate mesh 120 may comprise a parametric head model and the keypoint 122 may comprise one of a plurality of keypoints that are part of a keypoint regression network. The plurality of keypoints may be regressed using a DNN and used to generate the intermediate mesh 120.

Figure 1B:
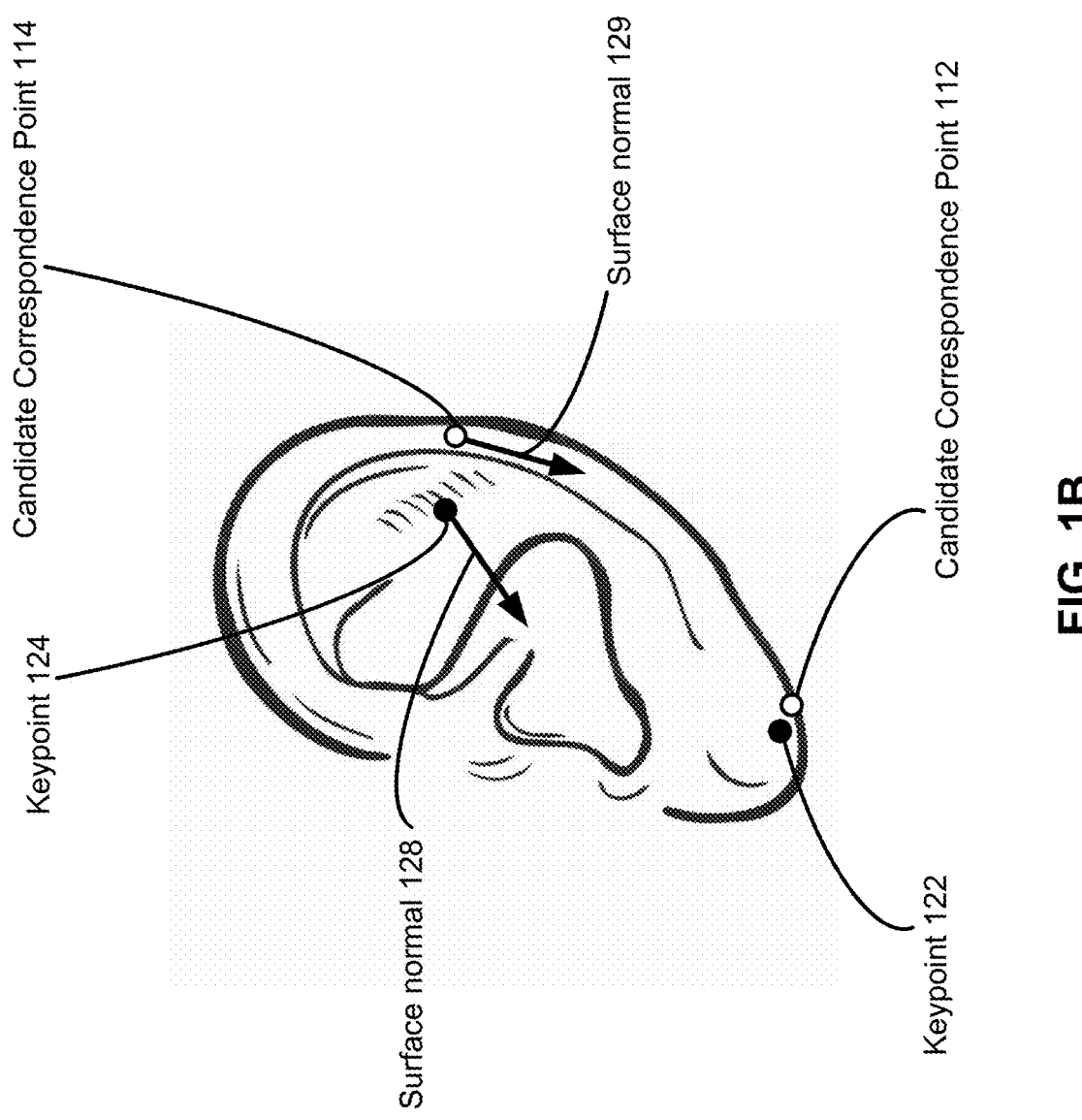
FIG. 1B depicts one embodiment of candidate correspondence points on the input scan mesh and corresponding keypoints on the intermediate mesh.

FIG. 1B depicts one embodiment of candidate correspondence points on the input scan mesh 110 and corresponding keypoints on the intermediate mesh 120. The keypoint 124 from the outer middle of an ear on the intermediate mesh 120 has a surface normal 128 and the candidate correspondence point 114 for the outer middle of the ear on the input scan mesh has a surface normal 129. A surface normal or normal vector may be orthogonal to a surface of a 3D mesh at a particular point. A location adjustment may be made in which the keypoint 124 is warped or repositioned from the location of the keypoint 124 to the location of the candidate correspondence point 114.

Figure 1C:
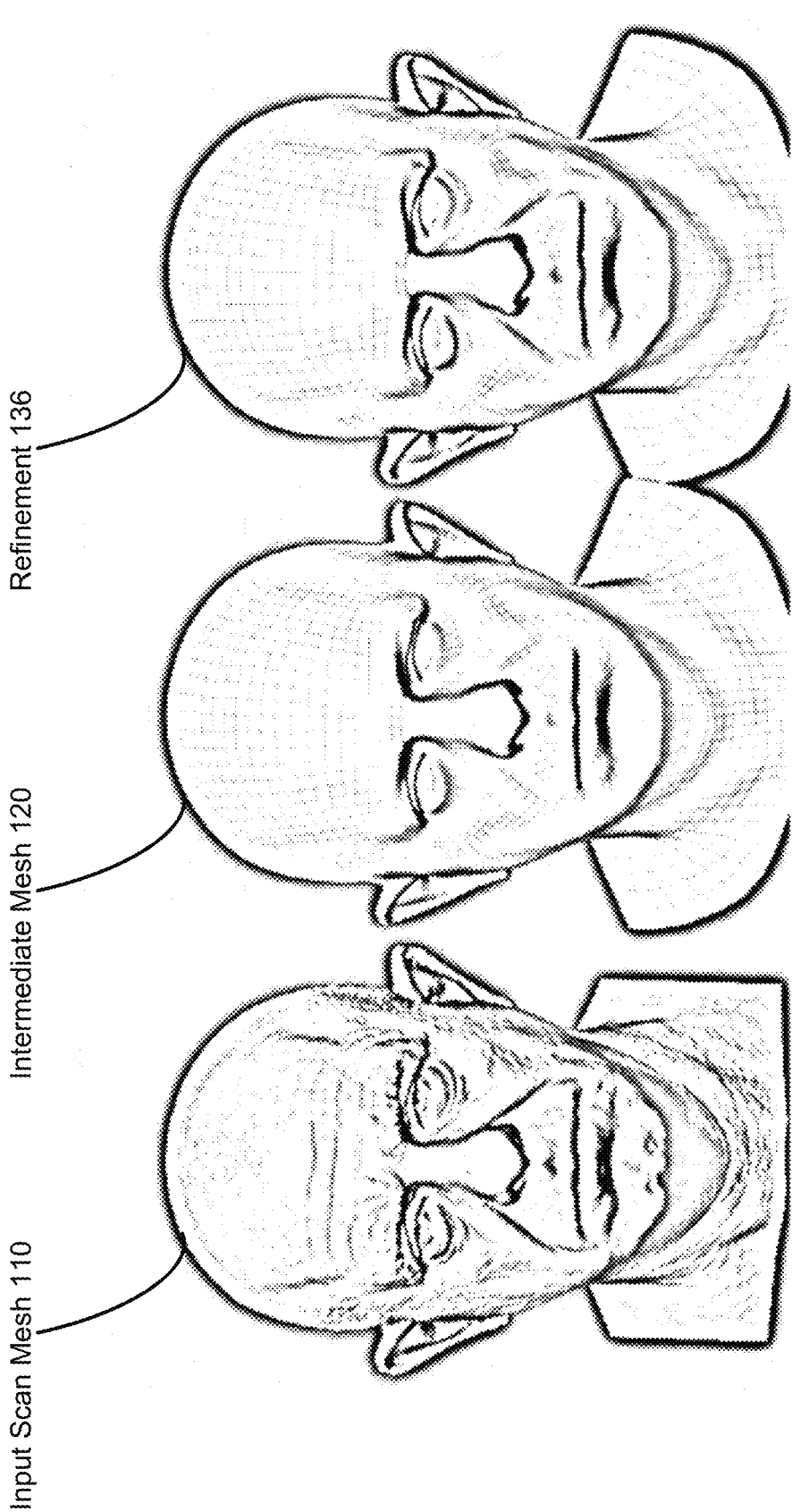
FIG. 1C depicts one embodiment of an input scan mesh, an intermediate mesh, and a final refinement mesh after photometric refinement has been applied to the intermediate mesh.

FIG. 1C depicts one embodiment on the input scan mesh 110, the intermediate mesh 120, and the final refinement mesh 136. The automated generation of the final refinement mesh 136 from images capturing different views of a human head may be performed using three stages. During the first stage, the intermediate mesh 120 is fit to the input scan mesh 100 via landmark regression. The intermediate mesh 120 may comprise a parametric 3D head model that is fit to match the topology of the input scan mesh 110. During the second stage, automated selection of correspondence points is performed to refine the locations of keypoints on the intermediate mesh 120. Updates to the locations of the keypoints may be automatically computed by sampling a subset of vertices (or points) on the intermediate mesh 120. For each sampled point, a location on the input scan mesh 110 may be identified as a candidate correspondence point.

In some embodiments, a candidate correspondence point on the input scan mesh 110 may comprise a point within a threshold distance of a sampled keypoint on the intermediate mesh 120 with the closest or best matching surface normal that is within a threshold distance of the sampled keypoint (e.g., within 2 cm of the sampled keypoint). In some embodiments, the candidate correspondence point on the input scan mesh 110 may be determined based on the best matching score that takes into account the surface normal similarities between the candidate correspondence point on the input scan mesh 110 and the sampled keypoint on the intermediate mesh 120. In one example, the matching score between the sampled keypoint and the candidate correspondence point may be calculated using the equation (1) with an a value set to ten. In some cases, a matching score may be computed that takes into account a difference in surface orientations, a difference in positions, and/or a difference in surface curvatures. During the third stage, the intermediate mesh 120 is photometrically refined to better match fine details found in the input scan mesh 110 (e.g., to better match the appearance of wrinkles on a face).

In some cases, landmarks are points in correspondence between two meshes of a human face. For a human face, landmarks may correspond with the tip of the nose or the corner of an eye. Landmarks play a role in face-related computer vision, e.g., being used to extract facial regions of interest, or helping to constrain 3D model fitting. However, many aspects of facial identity or expression cannot be encoded by a sparse set of landmarks alone. For example, without landmarks on the cheeks, we may not be able to tell whether or not someone has high cheek-bones. Or, without landmarks around the outer eye region, we cannot tell if someone is softly closing their eyes, or scrunching up their face. In order to reconstruct, for example, a human face more accurately, landmarks may be combined with additional signals such as depth images, or techniques such as differentiable rendering.

A keypoint is typically localized in an image by having a neural network generate a heatmap image, where the heatmap has high pixel values in parts of the image close to the keypoint, and low pixel values in parts of the image far away from the keypoint. Another algorithm may be run on the heatmap image (argmax) to find the largest value which is the peak. The location of the peak is the 2D location of the keypoint. The value of the peak of the heatmap may sometimes be used as a measure of uncertainty.

Alternatively, each keypoint may be predicted as a 2D random variable, normally distributed with location (x, y) and standard deviation sigma. A neural network may be trained to maximize the log-likelihood that samples from each predicted keypoint equal the ground truth. Keypoint uncertainty arises during training since the neural network is penalized for being wrong about keypoint location, as well as being uncertain. The following provides a derivation (assuming uniform prior on sigma):

The ground truth consists of a set of keypoint coordinates $Y \in \mathbb{R}^{N \times 2}$:

$$Y = \begin{bmatrix} x_0 & y_0 \\ x_1 & y_1 \\ \vdots & \vdots \\ x_N & y_N \end{bmatrix}$$

Each keypoint is predicted as a 2D random variable, normally distributed with location (x', y') and (circular) standard deviation $\sigma$. For a predicted keypoint random variable, the relative likelihood that a sample from that random variable will equal the ground truth keypoint location is:

$$\frac{1}{2\pi\sigma^2} e^{-\frac{(x-x')^2 + (y-y')^2}{2\sigma^2}}$$

For the full set of N keypoints, a set of coordinates are predicted $S \in \mathbb{R}^{N}$: $S = [\sigma_0, \sigma_1, \dots, \sigma_N]$ We work with log-likelihoods as they are more convenient. Since it is desired to maximize the log-likelihood that samples from each predicted keypoint equal the ground truth, a loss is minimized that is the sum of negative log likelihoods.

$$\text{Loss} = \sum_{i=0}^{N} -\log\left(\frac{1}{2\pi\sigma_i^2} e^{-\frac{(x_i - x_i')^2 + (y_i - y_i')^2}{2\sigma_i^2}}\right)$$

$$\sum_{i=0}^{N}\left(-\log\frac{1}{2\pi\sigma_i^2} - \log e^{-\frac{(x_i - x_i')^2 + (y_i - y_i')^2}{2\sigma_i^2}}\right)$$

$$\sum_{i=0}^{N} -\log\frac{1}{2\pi\sigma_i^2} - \sum_{i=0}^{N}\log e^{-\frac{(x_i - x_i')^2 + (y_i - y_i')^2}{2\sigma_i^2}}$$

$$\sum_{i=0}^{N}\log\left(2\pi\sigma_i^2\right) + \sum_{i=0}^{N}\frac{(x_i - x_i')^2 + (y_i - y_i')^2}{2\sigma_i^2}$$

For clarity, this is split into two parts:

$$\text{Loss} = \text{Loss}_\sigma + \text{Loss}_\mu \text{ where}$$

$$\text{Loss}_\sigma = \sum_{i=0}^{N}\log\left(2\pi\sigma_i^2\right) \text{ and } \text{Loss}_\mu = \sum_{i=0}^{N}\frac{(x_i - x_i')^2 + (y_i - y_i')^2}{2\sigma_i^2}$$

$\text{Loss}_\sigma$ penalizes the network for being too uncertain about keypoint predictions, and $\text{Loss}_\mu$ penalizes the network for making poorly localized keypoint predictions. Additionally, the symmetric Gaussian in the above example may be extended to non-symmetric Gaussian, in some cases.

The distribution of uncertainty values can also be influenced at training time by introducing a suitable prior. The formulation above assumes a uniform prior over the predicted sigmas. A natural choice of prior on sigma (or precision) of the (2D) Gaussian distribution is the Wishart distribution (the conjugate prior of a Gaussian distribution) although others can be used. This prior is a gamma distribution in the univariate case. This has the effect of encouraging the network at training time to allocate more neural resources to cases where it is currently doing poorly (where sigma is large) and less neural resources to where it is already comparatively certain (where sigma is small) in order to balance the usefulness of its keypoint predictions to downstream model fitting. See below for the derivation assuming Gamma prior.

Definitions (Precision, Gaussian Distribution, Gamma or Wishart)

$$\text{Precision } \tau := \frac{1}{\sigma^2}$$

$$p(x, \tau) = \mathcal{N}(x \mid \tau)Gam(\tau)$$

$$\mathcal{N}(x \mid \tau) = \frac{\tau}{2\pi}e^{-\tau(x-\mu)^2/2}$$

a and b are (manually) tuned constants "shape and inverse scale"

$$Gam(\tau \mid a, b) := \frac{1}{\Gamma(a)}b^a\tau^{a-1}e^{-b\tau}$$

Per Keypoint Log Likelihood Derivation $$\text{Maximise } p \text{ by minimising} - \log(p)$$

$$-\log(p) = -\log(\mathcal{N}) - \log(Gam)$$

$$-\log(\mathcal{N}) = \log(2\pi) - \log(\tau) + \tau(x - \mu)^2/2$$

$$-\log(Gam) = -\log\frac{b^a}{\Gamma(a)} - (a - 1)\log(\tau) + b\tau$$

Per Keypoint Loss Term For Gamma Prior
The first term $$-\log\frac{b^a}{\Gamma(a)}$$

is constant so has no effect on training (ignore it). Add the following instead of −log(Gam) to the loss:

$$=> \text{Loss} += b\tau - (a - 1)\log(\tau)$$

The same in terms of σ.

$$=> \text{Loss} += \frac{b}{\sigma^2} + 2(a - 1)\log(\sigma)$$

Additionally, object detection via keypoint uncertainty may be implemented. A sliding window may be applied over an image, and average keypoint confidence for each window may be measured. If a window with a high average keypoint certainty is not found, it can be determined that the object is not in the image. Otherwise, the window which reported the highest average keypoint confidence may be taken to contain the object.

Some of the use cases enabled using the described techniques include receiving image input from regular color (RGB) cameras rather than depth cameras, prediction of many more landmarks, and use cases in combination with a model fitter that predicts intrinsic camera parameters (e.g., focal length). This is important to achieve good results for recovering 3D structure from RGB images taken by a variety of cameras. Additional use cases include performing 3D reconstruction from multiple views, where the uncertainty in each view is taken into account, and where the extrinsic parameters of each camera are simultaneously optimized. More generally, the image inputs may be received from various types of cameras such as web cameras, depth, cameras on a head-mounted display (HMD), IR cameras, event cameras, etc. and the images can be RGB, depth mapped, IR, etc., Placement of the cameras can be outside-in (e.g., sensors are stationary as in web cams), or introspective positional tracking, where the cameras or sensors are located on the device being tracked (e.g., HMD). In the case of HMDs, the dense landmarks on the observed parts of the face may also be used to localize the HMD itself relative to the face.

Keypoint confidence, or certainty, may be useful when landmark detection algorithms consume the keypoints. For example, when fitting a 3D model to 2D keypoints, if a keypoint confidence is low, that keypoint may be considered to be unreliable and discounted during model fitting. This may occur if that keypoint is occluded, for example. Estimating uncertainty may also be useful to train better landmark estimators. In some cases, a neural network, can determine confidence values for each keypoint.

Figure 1D:
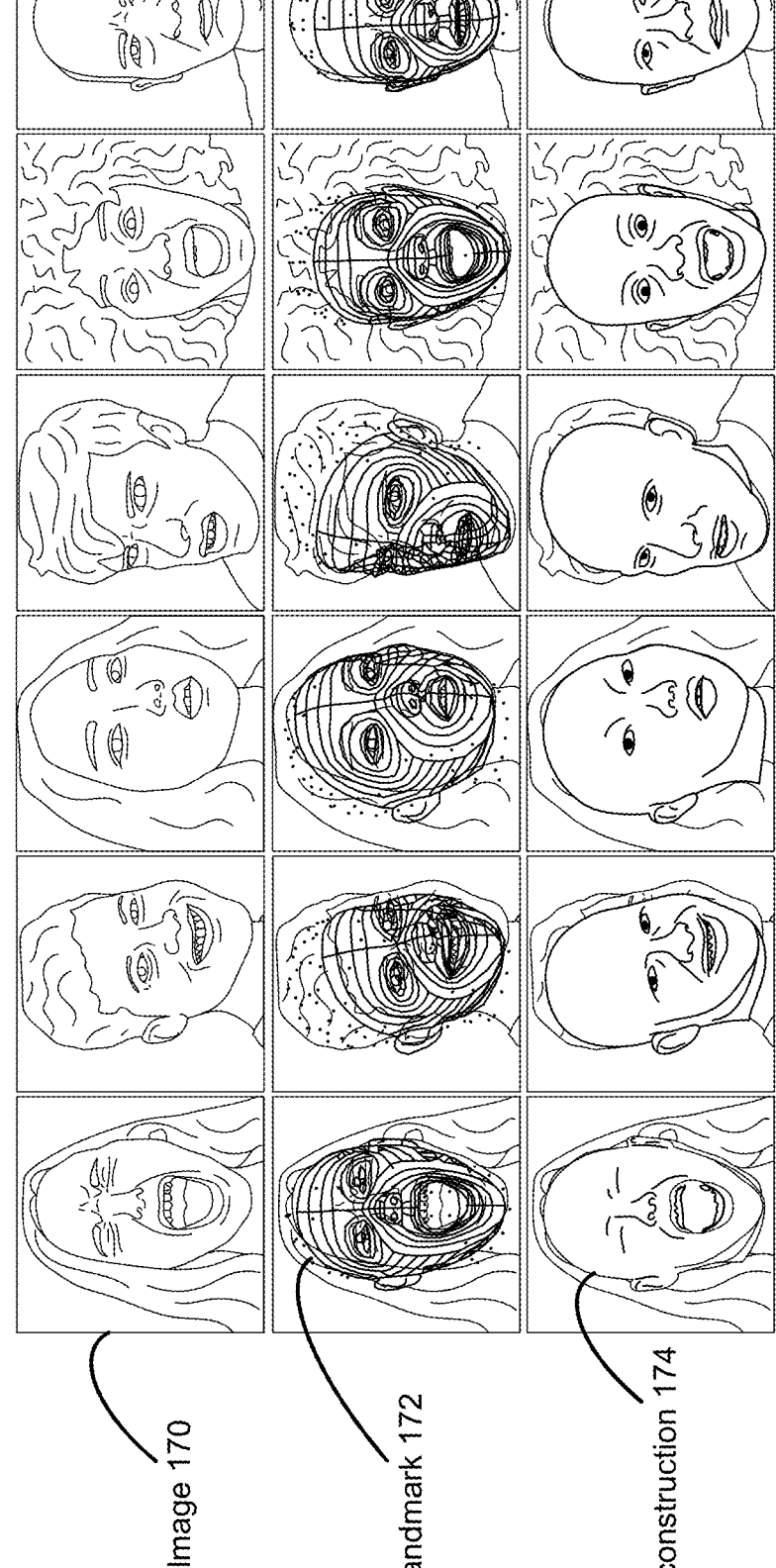
FIG. 1D depicts various embodiments of images, facial landmarks, and facial reconstructions.

Referring to FIG. 1D given a single image 110, a number of landmarks (e.g., 70 landmarks) including landmark 172 may be robustly and accurately predicted. To aid visualization, lines are drawn between landmarks. A 3D morphable face model may be fit to the predicted landmarks to reconstruct faces in 3D, such as face reconstruction 174.

Figure 1E:
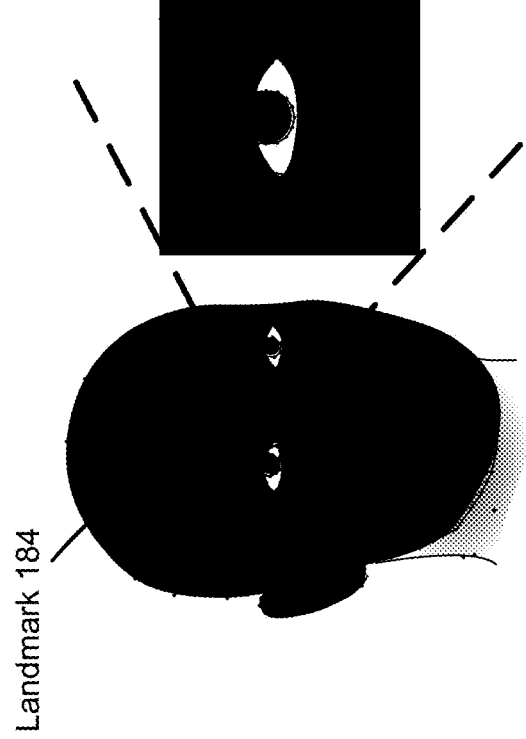
FIG. 1E depicts embodiments of a sparse set of facial landmarks and a dense set of landmarks associated with human facial features.
Figure 1E:
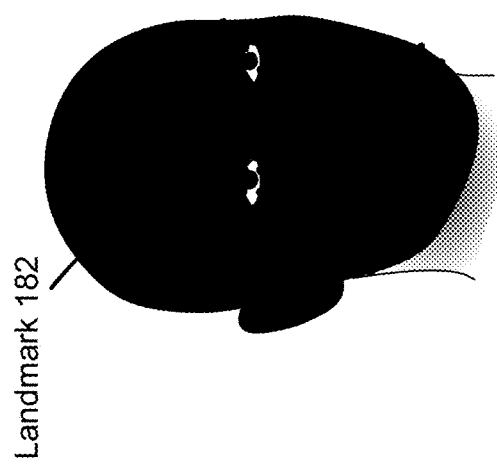

Referring to FIG. 1E, compared to a sparse set of facial landmarks, a dense set of landmarks may be utilized to cover an entire head in greater detail, including ears, eyes, and teeth. These dense landmarks can provide improved detection of facial identity and subtle expressions. As depicted in FIG. 1E, the sparse set of facial landmarks includes landmark 182 and the dense set of landmarks includes landmark 184.

Figure 2A:
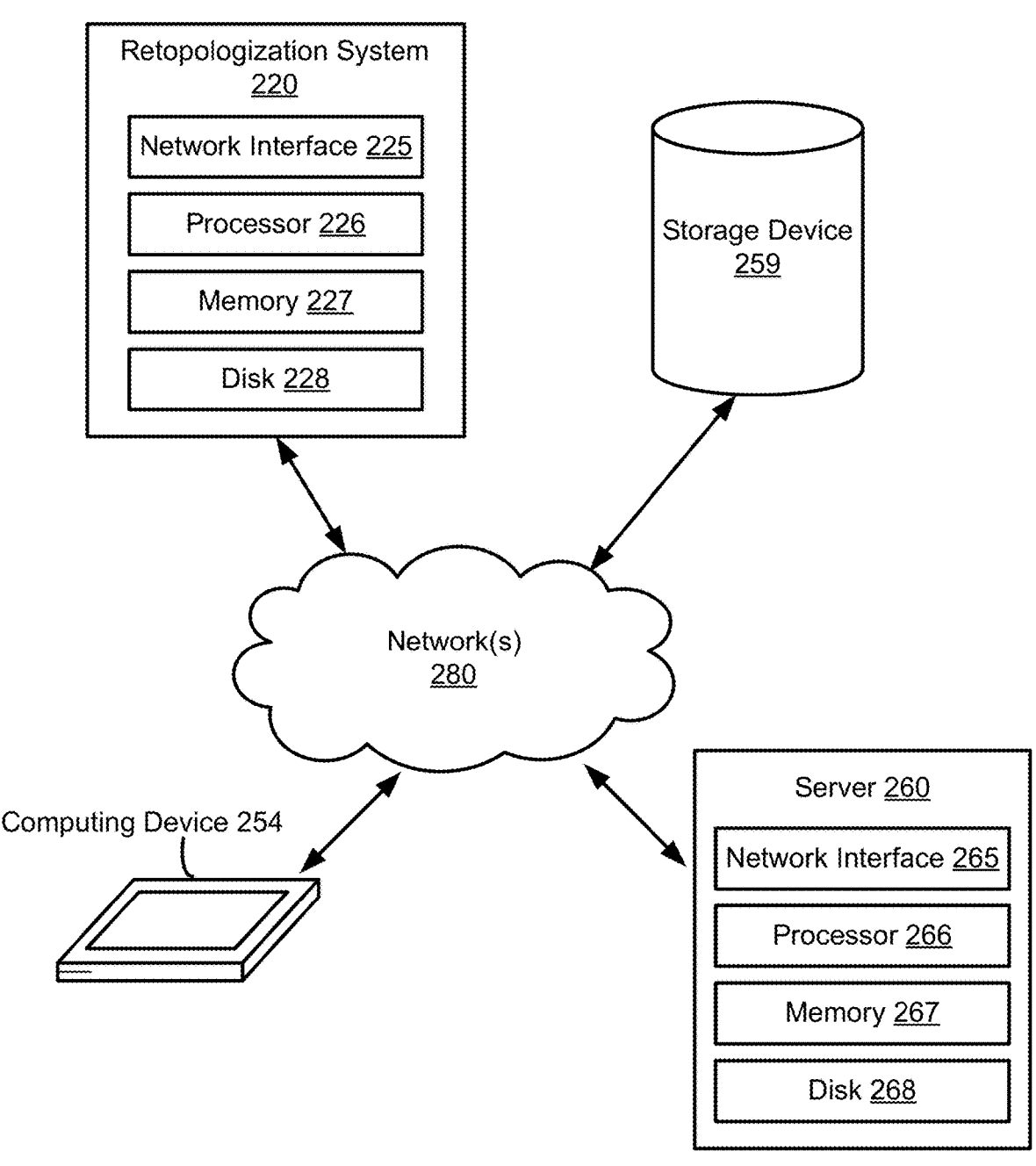
FIG. 2A depicts one embodiment of a networked computing environment in which the disclosed technology may be practiced.

FIG. 2A depicts one embodiment of a networked computing environment 200 in which the disclosed technology may be practiced. The networked computing environment 200 includes a retopologization system 220, storage device 259, server 260, and a computing device 254 in communication with each other via one or more networks 280. The networked computing environment 200 may include various computing and storage devices interconnected through one or more networks 280. The networked computing environment 200 may correspond with or provide access to a cloud computing environment providing Software-as-a-Service (SaaS) or Infrastructure-as-a-Service (IaaS) services. The one or more networks 280 may allow computing devices and/or storage devices to connect to and communicate with other computing devices and/or other storage devices. In some cases, the networked computing environment 200 may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, a data storage system, or a cloud-based data storage system. The one or more networks 280 may include a cellular network, a mobile network, a wireless network, a wired network, a secure network such as an enterprise private network, an unsecure network such as a wireless open network, a local area network (LAN), a wide area network (WAN), the Internet, or a combination of networks.

In some embodiments, the computing devices within the networked computing environment 200 comprises real hardware computing devices or virtual computing devices, such as one or more virtual machines. The storage devices within the networked computing environment 200 may comprise real hardware storage devices or virtual storage devices, such as one or more virtual disks. The real hardware storage devices may include non-volatile and volatile storage devices.

The retopologization system 220 may comprise a distributed computing system or a system for performing automated retopologization of 3D meshes. As depicted in FIG. 2A, the retopologization system 220 includes a network interface 225, processor 226, memory 227, and disk 228 all in communication with each other. The network interface 225, processor 226, memory 227, and disk 228 may comprise real components or virtualized components. In one example, the network interface 225, processor 226, memory 227, and disk 228 may be provided by a virtualized infrastructure or a cloud-based infrastructure. Network interface 225 allows the retopologization system 220 to connect to one or more networks 280. Network interface 225 may include a wireless network interface and/or a wired network interface. Processor 226 allows the retopologization system 220 to execute computer readable instructions stored in memory 227 in order to perform processes described herein. Processor 226 may include one or more processing units, such as one or more CPUs, one or more GPUs, and/or one or more NPUs. Memory 127 may comprise one or more types of memory (e.g., RAM, SRAM, DRAM, EEPROM, Flash). Disk 228 may include a hard disk drive and/or a solid-state drive. Memory 227 and disk 228 may comprise hardware storage devices.

The computing device 254 may comprise a mobile computing device, such as a tablet computer, that allows a user to access a graphical user interface for the retopologization system 220. A user interface may be provided by the retopologization system 220 and displayed using a display screen of the computing device 254.

A server, such as server 260, may allow a client device, such as the retopologization system 220 or computing device 254, to download information or files (e.g., executable, text, application, audio, image, or video files) from the server. The server 260 may comprise a hardware server. In some cases, the server may act as an application server or a file server. In general, a server may refer to a hardware device that acts as the host in a client-server relationship or to a software process that shares a resource with or performs work for one or more clients.

The server 260 includes a network interface 265, processor 266, memory 267, and disk 268 all in communication with each other. Network interface 265 allows server 260 to connect to one or more networks 280. Network interface 265 may include a wireless network interface and/or a wired network interface. Processor 266 allows server 260 to execute computer readable instructions stored in memory 267 in order to perform processes described herein. Processor 266 may include one or more processing units, such as one or more CPUs, one or more GPUs, and/or one or more NPUs. Memory 267 may comprise one or more types of memory (e.g., RAM, SRAM, DRAM, EEPROM, Flash). Disk 268 may include a hard disk drive and/or a solid-state drive. In some cases, the disk 268 includes a flash-based SSD or a hybrid HDD/SSD drive. Memory 267 and disk 268 may comprise hardware storage devices.

The networked computing environment 200 may provide a cloud computing environment for one or more computing devices. In one embodiment, the networked computing environment 200 may include a virtualized infrastructure that provides software, data processing, and/or data storage services to end users accessing the services via the networked computing environment. In one example, networked computing environment 200 may provide cloud-based applications to computing devices, such as computing device 254, using the retopologization system 220.

FIG. 2B depicts one embodiment of various components of the retopologization system 220. As depicted, the retopologization system 220 includes hardware-level components and software-level components. The hardware-level components may include one or more processors 270, one or more memories 271, and one or more disks 272. Both the one or more memories 271 and the one or more disks 272 may comprise storage devices. The software-level components may include software applications and computer programs. In some embodiments, the source 3D mesh generator 281, intermediate mesh generator 282, and photometric refinement controller 284 are implemented using software or a combination of hardware and software. The one or more processors 270 may comprise a processing system.

In some cases, the software-level components are run using a dedicated hardware server. In other cases, the software-level components may be run using a virtual machine or containerized environment running on a plurality of machines. In various embodiments, the software-level components may be run from the cloud (e.g., the software-level components may be deployed using a cloud-based compute and storage infrastructure).

As depicted in FIG. 2B, the software-level components may also include virtualization layer processes, such as virtual machine 273, hypervisor 274, container engine 275, and host operating system 276. The hypervisor 274 may comprise a native hypervisor (or bare-metal hypervisor) or a hosted hypervisor (or type 2 hypervisor). The hypervisor 274 may provide a virtual operating platform for running one or more virtual machines, such as virtual machine 273. A hypervisor may comprise software that creates and runs virtual machine instances. Virtual machine 273 may include a plurality of virtual hardware devices, such as a virtual processor, a virtual memory, and a virtual disk. The virtual machine 273 may include a guest operating system that has the capability to run one or more software applications. The virtual machine 273 may run the host operation system 276 upon which the container engine 275 may run.

A container engine 275 may run on top of the host operating system 276 in order to run multiple isolated instances (or containers) on the same operating system kernel of the host operating system 276. Containers may facilitate virtualization at the operating system level and may provide a virtualized environment for running applications and their dependencies. Containerized applications may comprise applications that run within an isolated runtime environment (or container). The container engine 275 may acquire a container image and convert the container image into running processes. In some cases, the container engine 275 may group containers that make up an application into logical units (or pods). A pod may contain one or more containers and all containers in a pod may run on the same node in a cluster. Each pod may serve as a deployment unit for the cluster. Each pod may run a single instance of an application.

In some embodiments, the depicted components of the retopologization system 220 that includes the intermediate mesh generator 282 are implemented in the cloud or in a virtualized environment that allows virtual hardware to be created and decoupled from the underlying physical hardware.

In some embodiments, the intermediate mesh generator 282 may perform the automated selection and adjustment of correspondence points to refine the locations of correspondence points on an intermediate 3D mesh, such as the intermediate mesh 120 in FIG. 1A.

The retopologization system 220 may store and utilize one or more machine learning models that are stored in a memory, such as memory 271. The one or more machine learning models may be trained, executed, and/or deployed using one or more processors, such as processor 270. The one or more machine learning models may include neural networks (e.g., deep neural networks), support vector machine models, decision tree-based models, k-nearest neighbor models, Bayesian networks, or other types of models such as linear models and/or non-linear models. A linear model may be specified as a linear combination of input features. A neural network may comprise a feed-forward neural network, recurrent neural network, or a convolutional neural network. The one or more machine learning models may include one or more generative AI models. The one or more machine learning models may include one or more multimodal models. The one or more machine learning models may include one or more language models, such as security specific LLMs.

A large language model (LLM) may refer to a language model that comprises a neural network with a large number of parameters (e.g., millions or billions of parameters or weights). In order to reduce training time and cost, transfer learning may be utilized in which a pre-trained model is used as a starting point for a specific task and then trained or fine-tuned with a supervised dataset for the specific task. In one example, an LLM may be pre-trained using a large dataset and then fine-tuned using a much smaller dataset to tailor the LLM to solve a specific task. Pretraining may refer to the act of training a machine learning model from scratch without any prior knowledge using a large corpus of data. Fine-tuning may refer to a transfer learning process that modifies a pretrained LLM by training the LLM in a supervised or semi-supervised manner. In some cases, the fine-tuning involves adapting a pretrained LLM for a specific task by fine-tuning the LLM using a task specific dataset.

An LLM may comprise a transformer model that is implemented using a transformer-based neural network architecture. A transformer model may include an encoder and/or a decoder. An encoder may extract features from an input sequence and a decoder may use the extracted features from the encoder to produce an output sequence. In some cases, an encoder comprises one or more encoding layers and a decoder may comprise one or more decoding layers. Each encoding and decoding layer may include a self-attention mechanism that relates tokens within a sequence of tokens to other tokens within the sequence. In one example, the self-attention mechanism may allow the transformer model to examine a word within a sentence and determine the relative importance of other words within the same sentence to the examined word. In some cases, an encoder includes a self-attention layer and a feed forward neural network layer and a decoder may include two self-attention layers and a feed forward neural network layer. A transformer model (or transformer) may utilize an encoder-decoder architecture, an encoder only architecture, or a decoder only architecture.

One example of a transformer model is a Generative Pre-trained Transformer (GPT) model. A GPT model may comprise a type of LLM that uses deep learning to generate human-like text. A GPT model may be referred to as being "generative" because it can generate new content based on a given input prompt (e.g., a text prompt), "pre-trained" because it is trained on a large corpus of data before being fine-tuned for specific tasks, and a "transformer" because it utilizes a transformer-based neural network architecture to process the input prompt to generate the output content (or response). Generative AI may be used to generate new content, such as text, images, audio, and video content.

In some embodiments, a machine learning model is trained to generate a language text response (or completion) given an inputted text prompt. The inputted text prompt may provide information to help guide the machine learning model to generate an appropriate text response. Prompt engineering may be used to alter or update the inputted text prompt such that the machine learning model generates a more relevant text response. In some cases, the text response is generated by predicting the next set of words in a sequence of words provided by the inputted text prompt using a transformer model, such as a GPT language model. The transformer model may be trained using sets of input prompt-response pairs.

Multimodal learning may refer to a type of machine learning in which a machine learning model is trained to understand multiple forms of input data (e.g., text, images, video, and audio data) that derive from different modalities. Image data may include different types of images, such as color images, depth images, and thermal images. In some cases, a machine learning model comprises a multimodal model, a language model, or a visual model.

FIG. 3A depicts a flowchart describing one embodiment of a process for automating the retopologization of 3D meshes. In one embodiment, the process of FIG. 3A may be performed by a retopologization system, such as the reto-pologization system 220 in FIG. 2B. In another embodiment, the process of FIG. 3A may be implemented using a cloud-based computing platform or cloud-based computing services.

In step 302, a set of images is acquired. The set of images may include images capturing different viewpoints of an object. The images may comprise RGB images and/or depth images. The object may comprise a human head or a human face. In step 304, an input scan mesh for the object is generated using the set of images. In some cases, the input scan mesh may be generated using landmark detection or landmark regression. In other cases, the input scan mesh may be generated via photogrammetry. The input scan mesh may be generated using the source 3D mesh generator 281 in FIG. 2B.

In step 306, an intermediate mesh for the object that has a geometry that approximates the input scan mesh is generated. The intermediate mesh may be generated using keypoint regression (or landmark regression). The intermediate mesh may be generated using the intermediate mesh generator 282 in FIG. 2B. In step 308, a keypoint on the intermediate mesh is identified. In some cases, the intermediate mesh may have a number of keypoints associated with features of the object. In one example, the object may comprise a human face and the number of keypoints may comprise 70 keypoints associated with different facial features. For each keypoint, up to a maximum number of candidate correspondence points may be considered (e.g., up to ten candidate correspondence points).

In step 310, a distance between the keypoint on the intermediate mesh and a candidate correspondence point on the input scan mesh is determined. Distance may correspond with the difference between a first position associated with the keypoint and a second position associated with the candidate correspondence point on the input scan mesh. In step 312, a first surface normal associated with the keypoint and a second surface normal associated with the candidate correspondence point is determined. In step 314, a matching score is calculated. The matching score may be calculated based on the distance between the keypoint and the candidate correspondence point, the first surface normal, and the second surface normal. In one embodiment, the matching score may be calculated using equation (1). In another embodiment, the matching score may be computed by determining a difference between the first surface normal and the second surface normal and summing a first weighted coefficient times the difference between the first surface normal and the second surface normal and a second weighted coefficient times the distance between the keypoint and the candidate correspondence point. In some cases, the matching score may be calculated based on a first position of the keypoint, a second position of the candidate correspondence point, the first surface normal, the second surface normal, and a similarity between a first surface associated with the keypoint and a second surface associated with the candidate correspondence point.

In step 316, the candidate correspondence point is selected based on the matching score. In one embodiment, the candidate correspondence point may have the highest matching score out of a set of possible correspondence points for the keypoint. In step 318, the intermediate mesh is adjusted or warped using the candidate correspondence point. In one embodiment, the intermediate mesh may be warped based on the candidate correspondence point. In step 320, a 3D mesh for the object is generated by applying photometric refinement to the intermediate mesh. The photometric refinement may be performed using the photometric refinement controller 284 in FIG. 2B.

FIG. 3B depicts a flowchart describing another embodiment of a process for automating the retopologization of 3D meshes. In one embodiment, the process of FIG. 3B may be performed by a retopologization system, such as the reto-pologization system 220 in FIG. 2B. In another embodiment, the process of FIG. 3B may be implemented using a cloud-based computing platform or cloud-based computing services.

In step 342, a source 3D mesh for an object is acquired. In step 344, a target 3D mesh for the object is generated. The target 3D mesh may be generated such that the target 3D mesh has a geometry that approximates the source 3D mesh or attempts to closely match the source 3D mesh. The target 3D mesh may be generated using the intermediate mesh generator 282 in FIG. 2B. In some cases, the target 3D mesh may have significantly fewer surfaces than the source 3D mesh. In step 346, a keypoint on the target 3D mesh is sampled. In step 348, a distance between the keypoint and a candidate correspondence point on the source 3D mesh is determined. In step 350, a first surface normal associated with the keypoint and a second surface normal associated with the candidate correspondence point are determined.

In step 352, a difference in surface curvature for a first surface associated with the keypoint and a second surface associated with the candidate correspondence point are determined. In step 354, a matching score is computed or determined based on a first position of the keypoint, a second position of the candidate correspondence point, the first surface normal, the second surface normal, and/or the difference in surface curvature. In one embodiment, the matching score may be computed using equation (1). The matching score may be computed using circuitry within the intermediate mesh generator 282 in FIG. 2B or executable code associated with the intermediate mesh generator 282 in FIG. 2B.

In step 356, the candidate correspondence point is selected based on the matching score. In one example, the candidate correspondence point may be selected as the best correspondence point for the keypoint on the target 3D mesh because the candidate correspondence point has the highest matching score out of a set of possible correspondence points for the keypoint. In step 358, the target 3D mesh is adjusted or warped using the candidate correspondence point. In step 360, photometric refinement is applied to the target 3D mesh. The photometric refinement may be performed using the photometric refinement controller 284 in FIG. 2B.

At least one embodiment of the disclosed technology includes a storage device for storing instructions that, when executed, cause the system to perform operations comprising: generating an input scan mesh associated with an object; generating an intermediate mesh associated with the object that has a geometry that approximates the input scan mesh; identifying a keypoint on the intermediate mesh; determining a distance between the keypoint and a candidate correspondence point on the input scan mesh; determining a first surface normal associated with the keypoint and a second surface normal associated with the candidate correspondence point; calculating a matching score based on the distance between the keypoint and the candidate correspondence point, the first surface normal, and the second surface normal; selecting the candidate correspondence point based on the matching score; and adjusting the intermediate mesh using the candidate correspondence point.

At least one embodiment of the disclosed technology includes generating an input scan mesh associated with an object, generating an intermediate mesh associated with the object that has a geometry that approximates the input scan mesh, identifying a keypoint on the intermediate mesh, determining a distance between the keypoint and a candidate correspondence point on the input scan mesh, determining a first surface normal associated with the keypoint and a second surface normal associated with the candidate correspondence point, calculating a matching score based on the distance between the keypoint and the candidate correspondence point, the first surface normal, and the second surface normal, selecting the candidate correspondence point based on the matching score, and adjusting the intermediate mesh using the candidate correspondence point The disclosed technology may be described in the context of computer-executable instructions being executed by a computer or processor. The computer-executable instructions may correspond with portions of computer program code, routines, programs, objects, software components, data structures, or other types of computer-related structures that may be used to perform processes using a computer. Computer program code used for implementing various operations or aspects of the disclosed technology may be developed using one or more programming languages, including an object oriented programming language such as Java or C++, a function programming language such as Lisp, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

The flowcharts and block diagrams in the figures provide illustrations of the architecture, functionality, and operation of possible implementations of systems, methods, and computer program products according to various aspects of the disclosed technology. In this regard, each step in a flowchart may correspond with a program module or portion of computer program code, which may comprise one or more computer-executable instructions for implementing the specified functionality. In some implementations, the functionality noted within a step may occur out of the order noted in the figures. For example, two steps shown in succession may, in fact, be executed substantially concurrently, or the steps may sometimes be executed in the reverse order, depending upon the functionality involved. In some implementations, steps may be omitted and other steps added without departing from the spirit and scope of the present subject matter. In some implementations, the functionality noted within a step may be implemented using hardware, software, or a combination of hardware and software. As examples, the hardware may include microcontrollers, microprocessors, field programmable gate arrays (FPGAs), and electronic circuitry.

For purposes of this document, the term "processor" may refer to a real hardware processor or a virtual processor, unless expressly stated otherwise. A virtual machine may include one or more virtual hardware devices, such as a virtual processor and a virtual memory in communication with the virtual processor.

For purposes of this document, it should be noted that the dimensions of the various features depicted in the figures may not necessarily be drawn to scale.

For purposes of this document, reference in the specification to "an embodiment," "one embodiment," "some embodiments," "another embodiment," and other variations thereof may be used to describe various features, functions, or structures that are included in at least one or more embodiments and do not necessarily refer to the same embodiment unless the context clearly dictates otherwise.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify or distinguish separate objects.

For purposes of this document, the term "set" of objects may refer to a "set" of one or more of the objects.

For purposes of this document, the phrases "a first object corresponds with a second object" and "a first object corresponds to a second object" may refer to the first object and the second object being equivalent, analogous, or related in character or function.

For purposes of this document, the term "or" should be interpreted in the conjunctive and the disjunctive. A list of items linked with the conjunction "or" should not be read as requiring mutual exclusivity among the items, but rather should be read as "and/or" unless expressly stated otherwise. The terms "at least one," "one or more," and "and/or," as used herein, are open-ended expressions that are both conjunctive and disjunctive in operation. The phrase "A and/or B" covers embodiments having element A alone, element B alone, or elements A and B taken together. The phrase "at least one of A, B, and C" covers embodiments having element A alone, element B alone, element C alone, elements A and B together, elements A and C together, elements B and C together, or elements A, B, and C together. The indefinite articles "a" and "an," as used herein, should typically be interpreted to mean "at least one" or "one or more," unless expressly stated otherwise.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The disclosure presented herein encompasses the subject matter set forth in the following example clauses.

Clause 1: A system for automating the retopologization of 3D meshes, comprising: a storage device for storing instructions that, when executed, cause the system to perform operations comprising: generating an input scan mesh associated with an object; generating an intermediate mesh associated with the object that has a geometry that approximates the input scan mesh; identifying a keypoint on the intermediate mesh; determining a distance between the keypoint and a candidate correspondence point on the input scan mesh; determining a first surface normal associated with the keypoint and a second surface normal associated with the candidate correspondence point; calculating a matching score based on the distance between the keypoint and the candidate correspondence point, the first surface normal, and the second surface normal; selecting the candidate correspondence point based on the matching score; and adjusting the intermediate mesh using the candidate correspondence point.

Clause 2: The system of clause 1, further comprising instructions that, when executed, cause the system to perform operations comprising: adjusting the keypoint to the candidate correspondence point; and warping the intermediate mesh using the candidate correspondence point.

Clause 3: The system of clause 1, further comprising instructions that, when executed, cause the system to perform operations comprising: generating a 3D mesh for the object by applying photometric refinement to the intermediate mesh.

Clause 4: The system of clause 1, further comprising instructions that, when executed, cause the system to perform operations comprising: determining a surface curvature associated with a first surface at the keypoint; and calculating the matching score based on the surface curvature associated with the first surface at the keypoint.

Clause 5: The system of clause 1, further comprising instructions that, when executed, cause the system to perform operations comprising: determining a vector difference between the first surface normal and the second surface normal; and calculating the matching score based on the vector difference.

Clause 6: The system of clause 1, further comprising instructions that, when executed, cause the system to perform operations comprising: acquiring a set of images that capture different views of the object; and generating the input scan mesh using the set of images.

Clause 7: The system of clause 1, further comprising instructions that, when executed, cause the system to perform operations comprising: restricting the candidate correspondence point to be within a threshold distance of the keypoint.

Clause 8: The system of clause 1, wherein: the object comprises a human head; and the intermediate mesh has fewer surfaces than the input scan mesh.

Clause 9: The system of clause 1, wherein: the intermediate mesh comprises a morphable model of 3D surfaces that is fit to the input scan mesh using keypoint regression techniques.

Clause 10: The system of clause 1, further comprising instructions that, when executed, cause the system to perform operations comprising: generating the intermediate mesh via keypoint regression using a deep neural network; determining a threshold distance based on a degree of uncertainty associated with the keypoint; displacing the keypoint in the direction of the first surface normal by the threshold distance; and identifying the candidate correspondence point out of a set of correspondence points with the highest matching score.

Clause 11: A method for automating the retopologization of 3D meshes, comprising: generating an input scan mesh associated with an object; generating an intermediate mesh associated with the object that has a geometry that approximates the input scan mesh; identifying a keypoint on the intermediate mesh; determining a distance between the keypoint and a candidate correspondence point on the input scan mesh; determining a first surface normal associated with the keypoint and a second surface normal associated with the candidate correspondence point; calculating a matching score based on the distance between the keypoint and the candidate correspondence point, the first surface normal, and the second surface normal; selecting the candidate correspondence point based on the matching score; and adjusting the intermediate mesh using the candidate correspondence point.

Clause 12: The method of clause 11, wherein: the adjusting the intermediate mesh includes warping the intermediate mesh based on a position of the candidate correspondence point.

Clause 13: The method of clause 11, further comprising: generating a 3D mesh for the object by applying photometric refinement techniques to the intermediate mesh.

Clause 14: The method of clause 11, further comprising: determining a surface curvature associated with a first surface at the keypoint; and calculating the matching score based on the surface curvature associated with the first surface at the keypoint.

Clause 15: The method of clause 11, further comprising: determining a vector difference between the first surface normal and the second surface normal; and calculating the matching score based on the vector difference.

Clause 16: The method of clause 11, further comprising: acquiring a set of images that capture different views of the object; and generating the input scan mesh using the set of images.

Clause 17: The method of clause 11, wherein: the object comprises a human torso; and the intermediate mesh has fewer surfaces than the input scan mesh.

Clause 18: The method of clause 11, wherein: the intermediate mesh comprises a morphable model of 3D surfaces that is fit to the input scan mesh using keypoint regression techniques.

Clause 19: The method of clause 11, further comprising: determining a threshold distance based on a degree of certainty associated with the keypoint; displacing the keypoint in the direction of the first surface normal by the threshold distance; and identifying the candidate correspondence point out of a set of correspondence points with the highest matching score.

Clause 20: A system for automating the retopologization of 3D meshes, comprising: a storage device configured to store a source 3D mesh; and a processing system in communication with the storage device that is configured to: generate a target 3D mesh that has a geometry that approximates the source 3D mesh; identify a keypoint on the target 3D mesh; determine a distance between the keypoint and a candidate correspondence point on the source 3D mesh; determine a first surface normal associated with the keypoint and a second surface normal associated with the candidate correspondence point; determine a difference in surface curvature for a first surface associated with the keypoint and a second surface associated with the candidate correspondence point; calculate a matching score based on the distance between the keypoint and the candidate correspondence point, a difference between the first surface normal and the second surface normal, and the difference in surface curvature; select the candidate correspondence point based on the matching score; warp the target 3D mesh using the candidate correspondence point; and apply photometric refinement to the target 3D mesh subsequent to warping the target 3D mesh.

The invention claimed is:

1. A system for automating the retopologization of 3D meshes, comprising:
a storage device for storing instructions that, when executed, cause the system to perform operations comprising:
generating an input scan mesh associated with an object;
generating an intermediate mesh associated with the object that has a geometry that approximates the input scan mesh;
identifying a keypoint on the intermediate mesh;
determining a threshold distance based on a degree of uncertainty associated with the keypoint on the intermediate mesh;
determining a first surface normal associated with the keypoint;
displacing the keypoint in the direction of the first surface normal by the threshold distance;
calculating a matching score based on a distance between the keypoint and a candidate correspondence point on the input scan mesh;
selecting the candidate correspondence point based on the matching score; and
adjusting the intermediate mesh using the candidate correspondence point.

2. The system of claim 1, further comprising instructions that, when executed, cause the system to perform operations comprising:
adjusting the keypoint to the candidate correspondence point; and
warping the intermediate mesh using the candidate correspondence point.

3. The system of claim 1, further comprising instructions that, when executed, cause the system to perform operations comprising:
generating a 3D mesh for the object by applying photometric refinement to the intermediate mesh.

4. The system of claim 1, further comprising instructions that, when executed, cause the system to perform operations comprising:
determining a surface curvature associated with a first surface at the keypoint; and
calculating the matching score based on the surface curvature associated with the first surface at the keypoint.

5. The system of claim 1, further comprising instructions that, when executed, cause the system to perform operations comprising:
determining a vector difference between the first surface normal and a second surface normal associated with the candidate correspondence point; and
calculating the matching score based on the vector difference.

6. The system of claim 1, further comprising instructions that, when executed, cause the system to perform operations comprising:
acquiring a set of images that capture different views of the object; and
generating the input scan mesh using the set of images.

7. The system of claim 1, further comprising instructions that, when executed, cause the system to perform operations comprising:
restricting the candidate correspondence point to be within the threshold distance of the keypoint.

8. The system of claim 1, wherein:
the object comprises a human head; and
the intermediate mesh has fewer surfaces than the input scan mesh.

9. The system of claim 1, wherein:
the intermediate mesh comprises a morphable model of 3D surfaces that is fit to the input scan mesh using keypoint regression techniques.

10. The system of claim 1, further comprising instructions that, when executed, cause the system to perform operations comprising:
generating the intermediate mesh via keypoint regression using a deep neural network; and
identifying the candidate correspondence point out of a set of correspondence points with the highest matching score.

11. A method for automating the retopologization of 3D meshes, comprising:
generating an input scan mesh associated with an object;
generating an intermediate mesh associated with the object that has a geometry that approximates the input scan mesh;
identifying a keypoint on the intermediate mesh;
determining a threshold distance based on a degree of certainty associated with the keypoint;
determining a first surface normal associated with the keypoint and a second surface normal associated with the candidate correspondence point;
displacing the keypoint in the direction of the first surface normal by the threshold distance;
calculating a matching score based on a distance between the keypoint and a candidate correspondence point on the input scan mesh, the first surface normal, and the second surface normal;
selecting the candidate correspondence point based on the matching score; and
adjusting the intermediate mesh using the candidate correspondence point.

12. The method of claim 11, wherein:
the adjusting the intermediate mesh includes warping the intermediate mesh based on a position of the candidate correspondence point.

13. The method of claim 11, further comprising:
generating a 3D mesh for the object by applying photometric refinement techniques to the intermediate mesh.

14. The method of claim 11, further comprising:
determining a surface curvature associated with a first surface at the keypoint; and
calculating the matching score based on the surface curvature associated with the first surface at the keypoint.

15. The method of claim 11, further comprising:
determining a vector difference between the first surface normal and the second surface normal; and
calculating the matching score based on the vector difference.

16. The method of claim 11, further comprising:

acquiring a set of images that capture different views of the object; and generating the input scan mesh using the set of images.

17. The method of claim 11, wherein:

the object comprises a human torso; and the intermediate mesh has fewer surfaces than the input scan mesh.

18. The method of claim 11, wherein:

the intermediate mesh comprises a morphable model of 3D surfaces that is fit to the input scan mesh using keypoint regression techniques.

19. The method of claim 11, further comprising:

identifying the candidate correspondence point out of a set of correspondence points with the highest matching score.

20. A system for automating the retopologization of 3D meshes, comprising:

a storage device configured to store a source 3D mesh; and a processing system in communication with the storage device that is configured to:

generate a target 3D mesh that has a geometry that approximates the source 3D mesh;

identify a keypoint on the target 3D mesh;

determine a threshold distance based on a degree of certainty associated with the keypoint;

determine a first surface normal associated with the keypoint and a second surface normal associated with the candidate correspondence point;

determine a difference in surface curvature for a first surface associated with the keypoint and a second surface associated with the candidate correspondence point;

displace the keypoint in the direction of the first surface normal by the threshold distance;

calculate a matching score based on a distance between the keypoint and a candidate correspondence point on the source 3D mesh, a difference between the first surface normal and the second surface normal, and the difference in surface curvature;

select the candidate correspondence point based on the matching score;

warp the target 3D mesh using the candidate correspondence point; and apply photometric refinement to the target 3D mesh subsequent to warping the target 3D mesh.

* * * * *